March 16, 1926.
R. E. MITTON
1,576,839
AUTOMATIC CONTROL FOR AEROPLANES
Filed July 13, 1925 2 Sheets-Sheet 1
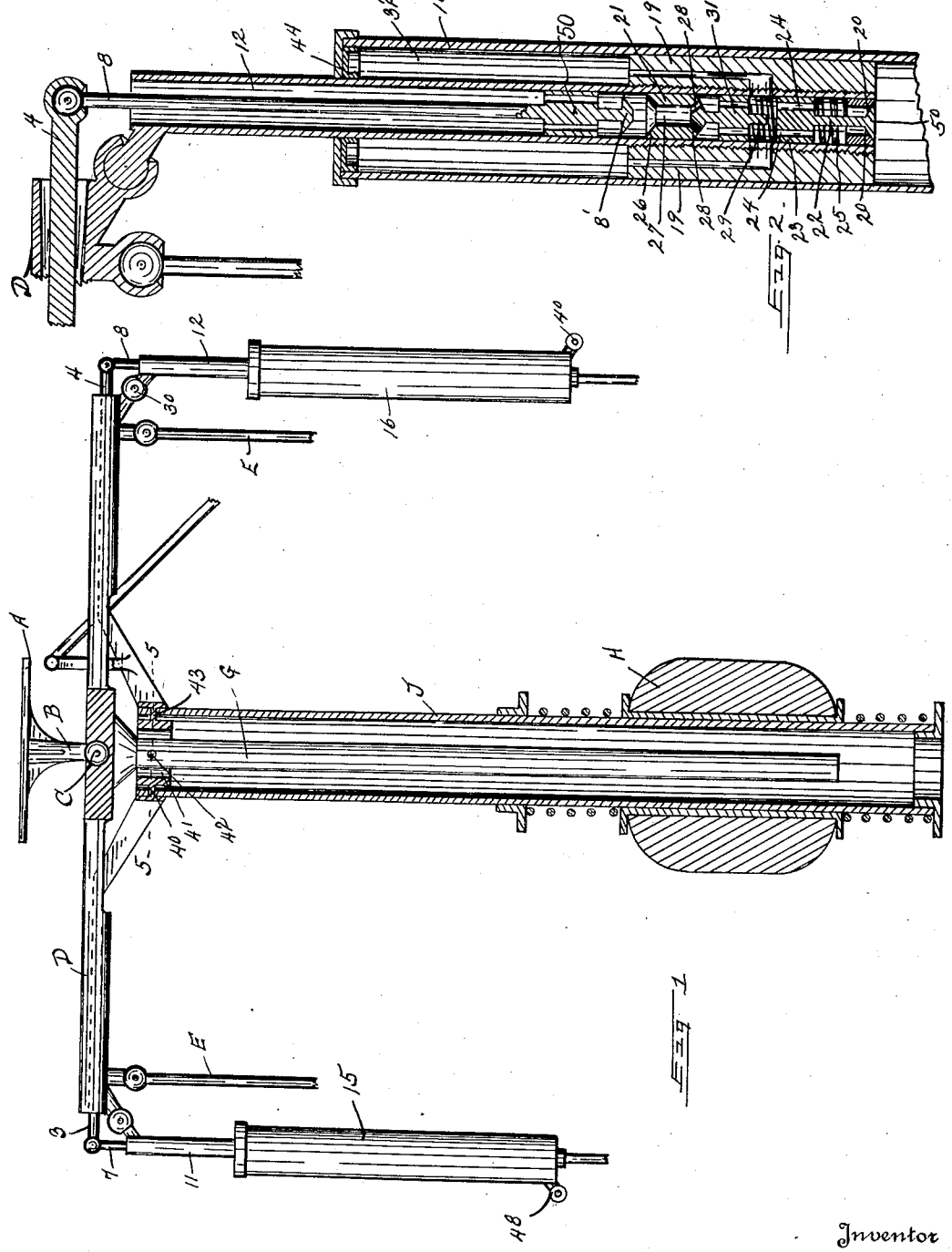
Inventor
Robert E. Mitton
By J M Thomas
Attorney March 16, 1926.
R. E. MITTON
1,576,839
AUTOMATIC CONTROL FOR AEROPLANES
Filed July 13, 1925　　2 Sheets-Sheet 2
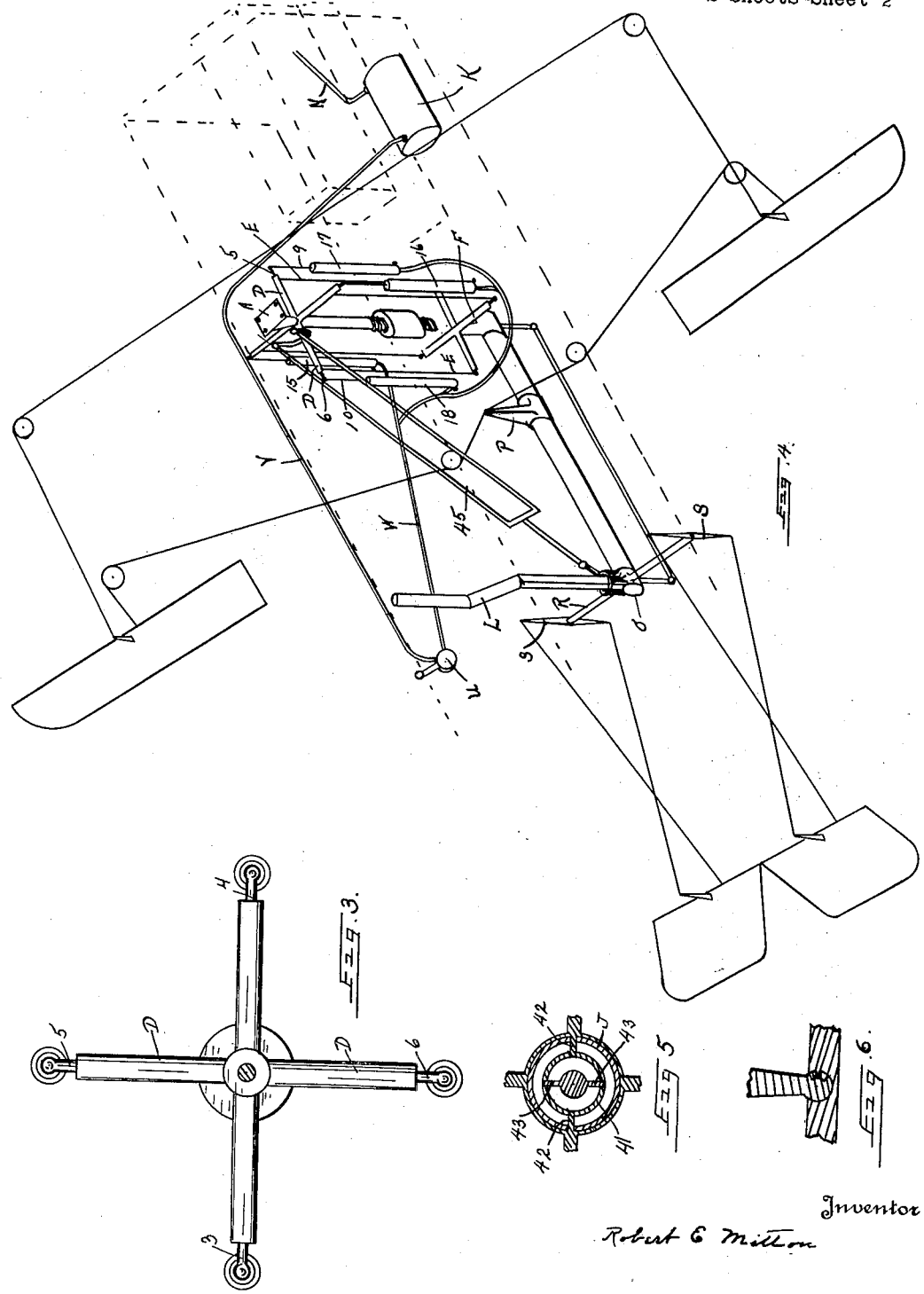
Inventor
Robert E. Mitton
By J. M. Thomas
Attorney Patented Mar. 16, 1926.

1,576,839

UNITED STATES PATENT OFFICE.

ROBERT E. MITTON, OF SALT LAKE CITY, UTAH.

AUTOMATIC CONTROL FOR AEROPLANES.

Application filed July 13, 1925. Serial No. 43,121.

*To all whom it may concern:*

Be it known that I, ROBERT E. MITTON, a citizen of the United States, residing at Salt Lake City, in the county of Salt Lake and State of Utah, have invented certain new and useful Improvements in Automatic Controls for Aeroplanes, of which the following is a specification.

The primary object of this invention is to provide means whereby the controls of an aeroplane in flight may be automatically operated or manipulated in a sensitive and efficient manner to keep the aeroplane balanced while in horizontal flight without the aid of and independent of the hand or manual corrections which are at present necessary to keep the aeroplane level or in a balanced position.

A further object is to embody dual stabilizing systems in one individual mechanism, each having a different degree or position of efficiency, allowing the optional use of the sensitive minor corrective operation but leaving the general, major corrective operation constant, not subject to being discontinued or dispensed with while the aeroplane is in flight, but allowing and providing for means whereby the sensitive, minor corrective operation may be discontinued or dispensed with at the option of the pilot while in flight, thus permitting the use of both systems jointly, or the major corrective operation separately, comprising an unchangeable component force in the assembly designed to instantly and automatically perform the large corrective movements necessary in times of extreme emergency, in addition to said optional minor corrective operation, thereby contributing to the avoidance of accidents.

A further object is to provide automatic means whereby an aeroplane equipped therewith may be banked or tipped relative to the earth to the correct degree when making a turn where the aerodynamic reaction of the wings opposes and exactly balances the resultant of the combined forces of gravity and centrifugal force, utilizing the the action of centrifugal force induced by the reaction of the rudder when operated in any degree to accomplish said banking. This allows an aeroplane to be kept under efficient control during conditions or periods of low visibility, or in case the pilot's judgment becomes erratic or interfered with for any reason, or confusion brought about by other adverse circumstances.

A further object is to provide means whereby aeroplanes may be flown for long continued periods of time without causing undue strain on the pilot and to automatically cause the different forces which are utilized to obtain flight, to act harmoniously, each reacting at its maximum efficiency, particularly the forces of gravity, centrifugal force, momentum and inertia and generally the forces of lift, drift, thrust and friction. The first named forces act directly on the stabilizer itself, while the second group of forces act only indirectly on same.

A further object is to provide means whereby an aeoplane may be safely operated by individuals not conversant with the scientific knowledge necessary to thoroughly understand the principles involved to accomplish flight, so that efficient control of aeroplanes may be effected by novices with but short periods of training and superficial instruction.

With these and other objects in view, I will now proceed to describe the invention, which consists of the novel arrangement, construction and action of the various parts illustrated in accompanying drawings, explained in the specification and pointed out in the appended claims.

In the accompanying drawings Figure 1 is a side view of the device, parts shown in section. Figure 2 is a vertical section showing the piston which is used in each of the air cylinders, together with the valves used therein. Figure 3 is a top view of the mechanism. Figure 4 is a digrammatic view in perspective, showing the device in place on an aeroplane, showing one form of installation, arrangement and details of the device which may be used when applied to a conventional type of stick control. Figure 5 is a transverse section on line 5—5 of Figure 1. Figure 6 is a section showing a detail of the ball and socket connection of the device with the plane.

In the drawings I have shown my invention secured to an aeroplane, but do not desire that it be limited to any particular type of aeroplane, as it will be obvious that it may be used on any type of plane, The suspension is by means of a plate A, which is secured by bolts or any similar fastening means to the body of the aeroplane, preferably to a special cross member or strut secured to the longerons of the fuselage. A depending and braced member B has a suitable universal pivot C, either a ball and socket as shown or other pivoting means to accomplish the purpose of holding my device in position. The pivotal point of said connection or pivot C is at the medial point of the cross arms D, and said cross arms D are connected by means of the vertical rods E with another cross arm member F, which, in turn, is secured on or connected with the manually operated control of the aeroplane in such a way as to operate said control when moved. A depending positioning shaft or control regulating bar G is fastened at its upper end and medially to the under side of said cross arms D. The outer end portion of each of said cross arms D is longitudinally bored to form housings for the spider rods 3, 4, 5 and 6, and each of said spider rods is pivotally connected by a ball and socket connection with the tops of their respective tappet rods 7, 8, 9 and 10. The said tappet rods each has a valve head 8' on its lower end and are each operable within the tubular connecting rods 11, 12, 13 and 14, which are pivotally connected at their upper ends to the cross arms D. Air cylinders 15, 16, 17 and 18 are provided, within which cylinders the respective tappet rods, connecting rods, valves and pistons are operated.

In the bottom of each piston a hole is drilled with its bottom edges ground to form a seat for the poppet valve 50 to fit against when closed, thus preventing the passage of air from the bottom of the piston within the cylinder through said hole, as long as said poppet valve rests in said seat. A stem 22, solidly connected to said valve and made a part thereof, extends upward through said hole and carries a guide flange 23 mounted on same to insure proper seating of said valve 50. Said guide is perforated or scored, as at 24, to allow the free passage of air through or around same. A spring 25 between said guide and said valve seat serves to keep said valve shut when it is not actuated and to close same after it has been actuated. Above said guide a movable, semi-tubular sleeve 21, having a valve seat 26 ground into its head, is mounted, said sleeve being ground air-tight so as to prevent leakage of air around edges of same, directing all air through valve hole 27 when it is opened by way of the ports 28 in same. A tappet carrying a guide 50, is used above the entire assembly, having a valve head mounted on the lower end of same, as shown at 8' in such a way as to cause the descent or depression of same to operate the lower valve assembly after seating in the valve seat 26 and sealing same. This action permits both top and bottom valves to be closed at the same time, or the bottom valve opened while the top valve is closed, or the top valve opened after the bottom valve has closed. A pin slot is provided to limit the movement of the sleeve 21. The bottom valve is the intake, while the top is the exhaust, said exhaust action being adjustable according to the limitation of movement of the sleeve 21 when same is actuated by the tappet 29. The upper end of each of said air cylinders is sealed by suitable gaskets to make an airtight chamber 32. Air ports 28 are bored in the respective valve guides or mill cuts may be scored in the sides of same to allow air to pass from the lower portion of the air cylinders through said ports or mill cuts in order to pass said guides without affecting same.

The air cylinders are pivotally mounted at their lower ends to the body of the aeroplane, as at 40. The angle braces 30 and tappet actuating rods 8 each have a ball and socket joint at their outer ends connecting said rods to the upper ends of the valve tappets, also the outer ends of the control cross arms D are provided with ball and socket joints connecting same to the connecting rods 7 to allow for limited movements in a universal direction of the above mentioned parts, and thus providing for the changing angles of connection between said parts.

The plumbing or pendulum element of my device embraces two features, the first of which is independent of the second, and provides for a quick acting stabilizer for correcting minor tiltings, and also by coacting with the second, if major tiltings occur, corrects said major tilting, both of which are automatic in their action.

A thimble, ring or short cylinder 41 is pivoted to and around the upper portion of said positioning shaft or plumb bar G by a pin 42 which connects said ring or thimble with said shaft G, and a cylindrical plumb or pendulum casing J is pivoted to and is connected at its upper end with said ring or thimble concentrically by other radially disposed pins 43 which are at right angles to the said pin 42, thereby forming a universal pivot connection between said shaft G and the pendulum or plumb casing J, as fully shown in Figure 5, in order that any movement of said casing J will be transmitted to two or more of said valve actuating arms mounted thereon to operate them. The said shaft G is spaced from the interior of said casing J to allow limited vertical movements of the outer ends of the said valve actuating rods or arms 3, 4, 5 and 6, and their connections, when said shaft is moved relative to the said casing J. When the aeroplane is tilted and the said shaft G is brought in contact with the lower end of the said casing J, the weight of said pendulum or weight H, mounted on said casing J, aids in operating the cross arms D to make the major corrections, in addition to the compressed air action thus brought about by the changing relation of the valve tappet actuating arms 3, 4, 5 and 6, and said cross arms D in cylinders 15, 16, 17 and 18, thus causing the aeroplane to return to an even keel longitudinally and laterally by means of the action of the ailerons and elevators thereby operated.

Having described the construction and arrangements of the device, I will now describe its action under various conditions:

Assuming that the aeroplane, turning on a longitudinal axis, has left a level position and tipped to the right, with the right wing tip lower than the left wing tip: The rigid control positioning shaft G, together with the control cross arms D, moves with the movement of the plane in unison with same, leaving the cylindrical pendulum casing J in a position relatively to the right, placing the rigid positioning shaft in a position relatively to the left. The control cross arms D will be thus moved, raising the left one and lowering the right one, carrying the respective pistons of each connected by the connecting rods 11 and 12 to said positions. The left piston raising in its cylinder 15 will bring the semi-tubular sleeve's valve seat 26 in top of same in contact with the valve head 8' mounted on the lower end of the tappet rod 8. The sleeve movement is thus restrained, causing the bottom valve guide 23 to come in contact with same by means of the spring 25 thus compressed, whereupon the lower poppet valve 50 is opened and compressed air is permitted to enter the chamber above the piston by means of the ports 24, and since it can not escape through the top of the cylinder around the packing of same, and since the upward movement of the semi-tubular sleeve has sealed the exhaust port in same against the valve head on the tappet rod, it will be seen that a downward pressure or depressing force will be brought to bear, which will cause said piston to descend in said cylinder as long as sufficient pressure is applied by the movement of the plane to keep the exhaust or lower valve 50 open. This action automatically operates the ailerons to correct the aeroplane's movement, and it will be seen that, as soon as the correct amount of aileron correction is applied, the said piston will cease to descend because of the closing of said intake valve 50 by the release of pressure upward against the tappet rod. This release of pressure does not, however, open the exhaust valve in the top of the semi-tubular sleeve until the aeroplane has commenced to return to a level position, whereupon the sleeve descends by the movement of the descending piston, allowing the exhaust port 27 to open gradually, and the exhaust of air and consequent release of applied correction pressure takes place. It will be seen, therefore, that the correction, when the plane tips, is not only applied as the said tipping action takes place, but also applies and holds pressure on said correcting elements until the aeroplane is returned to a level position, or to any desired distance or degree from level according to the adjustment on said valve action. It is also pointed out that provision is thus made for not applying an excessive or abrupt amount of correction, the correction applied depending entirely on the amount of movement from a level position of the aeroplane and applied in exact proportion. Thus, if the aeroplane tips 3° from level, a 3° correction is applied on the ailerons, or, if the plane tips 30°, a 30° correction is applied, etc. All such corrections are applied in exact proportion to the amount of movement away from a level or balanced position. If the plane has tipped 40°, a 40° correction is applied on the proper controlling surfaces; then, as the aeroplane starts returning to a level, this correction is gradually diminished so that at 30° a 30° correction is applied; at 20° a 20° correction is applied, etc., until the aeroplane has regained level, when the correction is terminated entirely.

As all parts are exactly duplicated on all four sides of the device, where they are located, viz, the front, left, back and right, it is apparent that the movement or tipping of the aeroplane to the left instead of to the right would bring about the opposite effect to that described above and returning the aeroplane to an even keel or level. When the aeroplane tips on a lateral axis, tipping up or down and putting the aeroplane in a descending or climbing angle, the front and back cylinders and units operate the elevators to correct such movements in exactly the same way as the ailerons are operated, as just described. However, the double or combined action of the mechanism, as in the case when the plane tips cornerwise or on a double axis, is a more complicated movement, so, in order that same may be clearly understood, I will proceed to explain the action of the various parts of the device when the aeroplane tips to the left and forward at the same time, or, in other words, cornerwise, downward to the left.

The rigid control positioning shaft G, mounted medially to the under side of the control cross arms D, will be actuated by the movement of the aeroplane to the back, right hand corner of the cylindrical pendulum casing at the bottom of same, leaving said pendulum, held by the force of gravity in a position to the front left hand corner side of said shaft; the four pistons in the air cylinders are carried by this action of the aeroplane, raising the right one, lowering the left one, raising the back one, and lowering the front one. It will now be seen that the valve actuating spider cross rods 3, 4, 5 and 6 are left in exactly opposite relative positions because of the action of gravity operating on the pendulum to which they are connected by means of the casing J continuing to hold them on a level or parallel with the surface of the earth, while the control cross rods 3 and 5, which operate their respective pistons 19 are carried to a position parallel laterally to the lateral axis of the aeroplane and longitudinally to the longitudinal axis of the aeroplane. Under this condition all corrective action will take place in the back and right hand cylinders 16 and 18, which has to do with the pneumatic corrective action, because the front and left pistons merely descend in their cylinder, not coming in contact with the front and left tappet rods 7 and 9. The back and right hand pistons raising in these two respective cylinders will bring the valve seats in the tubular sleeves 11 and 14 and on the tops of each in contact with the valve heads mounted on the lower ends of the tappet rods 7 and 9. The movement of these two sleeves is thus restrained, causing the bottom valve guides 23 to come in contact with same by means of the springs 25 thus compressed, whereupon the lower poppet valves 50 are opened, permitting compressed air to enter the chambers above these two respective pistons by means of the ports 24, and, since said air can not escape through the tops of these cylinders, being prevented by the packing 44 of same, and since the upward movement of the semi-tubular sleeves has sealed the exhaust ports in same against the valve head on the tappet rods, it will be seen that a downward pressure or depressing force will be brought to bear on each of said back and right pistons. Said pressure will cause said pistons to descend in their cylinders as long as sufficient pressure is applied by the movement of the plane staying off of a level position, to keep the exhaust or lower valves 50 open. This descending action of these two respective pistons, by means of the cross arm connection to the controls, will cause the ailerons and elevators to be automatically moved to correct the ship and return it to level. As soon as the correct amount of aileron and elevator movement is applied, it will be seen that the action will not continue, but will stop the movement at the right time, because of the closing of the intake valves 50, by the release of pressure upward of the intake valve guides 23 against the semi-tubular sleeves 21 which are positioned by the tappets 8' and 29. This release of pressure does not, however, open the exhaust valves in the tops of the semi-tubular sleeves 21 until the aeroplane has commenced to return to a level position and the sleeves 21 are allowed to descend after the release of pressure from the intake valve springs 25 effected by the closing of said valves, thus causing the exhaust valves to open gradually as the aeroplane regains level because of the descent of the sleeves 21 falling away from the valve heads 8' mounted on the bottoms of the tappets 7 and 9, permitting the release of the corrective pressure gradually and proportionately.

By means of the slight amount of play between the stick control socket to which the control wires are indirectly attached, and the stick itself, as shown in Figure 4, and the double universal joint connection of said stick through the rod 45 to the horns on the pivot ring of the valve tappet rod assembly, it will be seen that it is possible to use the power of the air in the pneumatic stabilizer assembly to operate the ailerons and elevators by said power instead of manually having to operate same, using the stick control as a valve control instead of a manual one. In this way it will be seen that a few ounces pressure on the stick control will bring about any desired pressure on the control surfaces up to several hundred pounds, according to the pressure carried in the stabilizer cylinders 15, 16, 17 and 18. In this way it would be possible for a pilot to control large multi-motored aeroplanes carrying great numbers of passengers and having extremely large control surfaces with less than the strength of one hand. When the valves are thus operated by the manipulation of the stick control to operate the control surfaces, the valve action is reversed in relation to the condition where the automatic action of the pendulum is used. For this reason I will describe the action of same under this condition.

In climbing in a spiral to the right, the pendulum under this condition will be actuated by the force of the hand to a position to the front, left hand side, relatively of the rigid control positioning shaft G, leaving said shaft within said cylindrical pendulum to remain in the relative back right hand corner or side of same. This action moves the entire assembly of valve actuating spider rods, shifting the right one down, the left one up, the forward one up and the back one down, each carrying its valve tappet rods with it to said relative positions. It will be seen that the control actuating spider rods are then left in an exactly opposite relative position, because of the action of the air pressure on the controlling surfaces holding the control actuating spider on a plane parallel laterally to the lateral axis of the aeroplane and longitudinally to the longitudinal axis of the aeroplane, while the valve actuating spider rods are all thrown to act parallel with the surface of the earth, or on a level. Since the left and front tappet rods are merely raised, the heads of these rods do not move the lower valves in the front and left pistons, thus no compressed air action is brought about on the left and front sides except the natural upward pressure of the air below the pistons in the cylinders; therefore, all the action bringing about movements is itself brought about by the descending tappet heads of the right and rear tappet rods pushing downward the two valve actuating sleeves contained in the right and rear pistons and opening the lower valves of same, permitting the compressed air in these two cylinders to simultaneously enter the chambers above said cylinders. In descending, the tappets have, with the same action, caused the exhaust valves attached to each, at the top of each respective piston, to close and imprison the air thus permitted to enter the top chambers of the cylinders through the ports and held there by the packing at the top of same, causing a pressure downward on each, equal to the area of the top level abutting faces of each and the air pressure involved. This moves the two connecting rods attached, between the respective right and rear pistons and their corresponding control actuating spider terminals to descend simultaneously, indirectly operating the control cables of the aeroplane to give the double action operation on the ailerons and elevators, returning the control actuating spider rods as soon as the ship assumes the desirable position again parallel with the valve actuating spider rods, causing the rigid control positioning rod G to again return to a dead center position in the circular pendulum J. At this point it is apparent that all parts are again in a normal position as at the start of the movement. The lower valves in the right and rear pistons have been closed by the descent of the right and rear pistons, at the same time opening the upper sleeve valves at the top of the right and rear pistons, allowing the escape or exhaust of the compressed air which had been imprisoned in the chambers above these two respective pistons. Therefore, the downward pressure on these two pistons is instantly terminated, and the upward air pressure below all four pistons, entering the cylinders at their bottoms from the storage tank K, is again equalized or balanced between the right and rear pistons and the left and front pistons, which have all returned to a central, balanced position, as long as the action is held on by the stick L.

At this point it is well to explain that the above action of all four ends of the above-mentioned double spider cross bar assembly, necessarily entails double axial movements at the joints between the valve actuating spider rod terminals and the corresponding tappet rods thereby connected to same and the control actuating spider rod terminals and their corresponding piston connecting rod terminals thereby attached. This double axial movement which operates in all cases on a lateral or transverse and horizontal plane, is effectively taken care of by the use of free acting ball and socket joints in the drawings illustrating same herewith. However, it is easily seen that suitably constructed universal joints could be used as successfully. On account of the ball and socket joint having less moving parts and stronger construction than the conventional universal joint, it is thought to be the logical medium to take care of this action.

Having described the methods used to obtain the corrections on the stabilizing surfaces of the aeroplane, I will now trace the movements of the mechanism which transmits action from the pistons within the compressed air cylinders to the control surfaces themselves.

In order to bring into play all moving parts, we will assume that the aeroplane is maneuvered up to the left. The pendulum casing J is moved to the right and forward, relatively, calling into play the air, as before described, raising the front and right long control actuating connecting rods mounted on the control actuating top spider and depressing the back and left ones, thereby throwing the bottom spider F mounted on the forward stick control socket in the same position as the top one. This action causes the stick L itself to be pushed to the left the same as though operated by the pilot's hands, causes the right aileron to be depressed and the left aileron raised by means of the turning action of the tubular shaft O upon which the stick sockets are mounted, throwing the horn P solidly mounted thereon to which are attached the aileron control cables and also causes the elevators to be raised by the turning action of the cross shaft R upon which the rear stick is mounted, and to the ends of which are mounted the two elevator arms S, as shown. This action is transmitted from the front socket by the connecting rod action of the rod 45 pivotally mounted at the bottoms of the arms I adjacent the bottom of both stick sockets.

The compressed air supply to operate the pistons in the cylinders is derived from the operation of a suitable small air compressor K connected to the driving power of the engine by gearing the driving wheel of said compressor or pump to the timing gears of the engine or by other efficient connections.

The air then passes through the line pipe N, made of suitable flexible material, as shown in Figure 4, to the storage tank K in which it maintains a constant predetermined air pressure. An escapement valve is provided in this tank K, as shown, to prevent the compressed air pressure becoming too great. The outlet line V then conveys the air to the valve U which may be controlled by the pilot's hands quickly to shut or open same or turning the air on or off. At this point it is seen that the pilot has, by virtue of this valve, instantaneous control over the pneumatic part of the stabilizer, to shut same off or on instantly or diminish or increase its power or effectiveness quickly or gradually or in any degree desired. From this valve the line W conducts the air, distributing it equally to the bottoms of the four cylinders 15, 16, 17 and 18 by means of the four tubes into which it branches at this point.

As no supports are shown in the drawings illustrating how the pivot joints are secured at the bottom of each cylinder and at other points throughout the mechanism, I will state at this point that a light framework is constructed and placed in and attached to the longerons of the fuselage and to this is attached all such pivots, joint or connection.

To resume the explanation of the automatic action on the device: It will be seen that all stabilizing corrective actions are induced and brought about by the relative changing position of the pendulum J suspended on its tubular lever and swung from a universal joint. It is then obvious that other forces affecting said pendulum other than the force of gravity affect the subsequent corrections automatically transmitted to the controlling surfaces, according to the kind and extent of the force applied to same. In this way, centrifugal force caused by the application of the rudder will cause said pendulum to swing or move out to the right or left according to which rudder action is used. This brings the air into play when same is on, in the same manner as when the stick is moved to one side or the other, and causes the ailerons to be operated to automatically pull the machine up into the exact bank because of the well-known principle of the pendulum continuously holding and indicating the degree or position of the resultant derived from the forces of gravity, lift and centrifugal force. After the machine has automatically banked to the exact degree the said resultant will cause the pendulum to return to a center or neutral position relative to the control assembly and the movement is complete, except when the rudder action is discontinued, whereupon centrifugal force ceases, gravity takes effect and the above process is exactly reversed automatically returning the aeroplane to a level position again.

Having thus described my invention and its operation I desire to secure by Letters Patent and claim:—

1. An automatic control for aeroplanes comprising a compressed air tank; air cylinders mounted adjacent thereto on the body of the plane; flexible air tubes connecting said tank and said cylinders; pistons operable in said cylinders; valves in said pistons to control the air in said cylinders; a pendulum suspended on said plane; arms on the upper portion of said pendulum; and connecting rods between said pistons and said arms to move said valves when the aeroplane is tilted.

2. An automatic control for aeroplane comprising a compressed air tank carried on said aeroplane; air cylinders mounted adjacent said air tank; flexible tubes carrying air from said air tank to said cylinders; pistons operable in said cylinders; valves in said pistons to control the air in said cylinders; a pendulum shaft suspended from the body of the aeroplane; a weighted casing suspended from said aeroplane and normally concentric with said pendulum shaft; a universal connection between said pendulum shaft and said casing; radially extended arms on the upper portion of said pendulum shaft; and connecting rods between said arms and said pistons to move the valves in said pistons automatically when the aeroplane is tilted.

3. A control for aeroplanes comprising a compressed air tank; air cylinders mounted adjacent said tank on the body of the plane; flexible air tubes connecting the interiors of said tank and said cylinders; pistons operable in said cylinders; valves in said pistons to control the air in said cylinders; connecting rods between said valves and a pendulum shaft; a pendulum shaft suspended from the body of said aeroplane; arms on the upper portion of said pendulum shaft; and a connecting rod between the manual control stick of the plane and said arms.

In testimony whereof I have affixed my signature.

ROBERT E. MITTON.